US012681419B2

(12) United States Patent
Tsuda

(10) Patent No.: US 12,681,419 B2
(45) Date of Patent: Jul. 14, 2026

(54) CLEANING DEVICE, IMAGE HOLDING BODY UNIT, AND IMAGE FORMING APPARATUS

(71) Applicant: FUJIFILM Business Innovation Corp., Tokyo (JP)

(72) Inventor: Yu Tsuda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,972

(22) Filed: Mar. 9, 2023

(65) Prior Publication Data

US 2024/0103424 A1 Mar. 28, 2024

(30) Foreign Application Priority Data

Sep. 27, 2022 (JP) ................................ 2022-153543

(51) Int. Cl.
*G03G 21/00* (2006.01)
*G03G 15/16* (2006.01)

(52) U.S. Cl.
CPC ....... *G03G 21/0029* (2013.01); *G03G 15/161* (2013.01); *G03G 21/0058* (2013.01)

(58) Field of Classification Search
CPC ......................... G03G 21/105; G03G 21/0029
See application file for complete search history.

(56) References Cited

U.S. PATENT DOCUMENTS

2017/0269511 A1* 9/2017 Tomita .................. G03G 21/10

FOREIGN PATENT DOCUMENTS

JP H0572949 A * 3/1993
JP 5-72949 B2 10/1993
JP 2000181315 A * 6/2000

* cited by examiner

*Primary Examiner* — Leon W Rhodes, Jr.
(74) *Attorney, Agent, or Firm* — Sughrue Mion, PLLC

(57) ABSTRACT

A cleaning device, for cleaning an image holding body that rotates while holding a toner image on an outer circumferential surface of the image holding body, includes: a scraping member that scrapes toner sticking to the outer circumferential surface of the image holding body in a rotating state by a distal end of the scraping member being in contact with, in the outer circumferential surface, in a region in which the image holding body moves upward from below; a trapping member in which toner scraped from the outer circumferential surface to fall is trapped; and at least one raising member that raises up toner trapped in the trapping member, toward the distal end of the scraping member.

12 Claims, 11 Drawing Sheets

CLEANING DEVICE, IMAGE HOLDING BODY UNIT, AND IMAGE FORMING APPARATUS

CROSS-REFERENCE TO RELATED APPLICATIONS

This application is based on and claims priority under 35 USC 119 from Japanese Patent Application No. 2022-153543 filed Sep. 27, 2022.

BACKGROUND

(i) Technical Field

The present disclosure relates to a cleaning device, an image holding body unit, and an image forming apparatus.

(ii) Related Art

Japanese Unexamined Patent Application Publication No. 5-72949 discloses a technique related to a cleaning device including a cleaning blade that is in contact with a surface of an image carrier in a moving state and removes residual toner from the surface. The technique employs a unit that guides the flow of air containing floating toner generated inside the cleaning device due to the movement of the image career, that is, directs the flow of the air toward both end portions of the cleaning blade.

SUMMARY

A cleaning device is provided with a scraping member that is in contact with the outer circumferential surface of the rotating image holding body and scrapes the residual toner on the outer circumferential surface. There is an instance where the scraping member scrapes the residual toner on the outer circumferential surface by a distal end of the scraping member being in contact with, in the outer circumferential surface, a region in which image holding body moves upward from below. In such an instance, the toner that has been scraped by the scraping member falls downward from the distal end of the scraping member, and the frictional force that is generated between the scraping member and the outer circumferential surface of the image holding body increases.

In the related art, to suppress such an increase in the frictional force that is generated between the scraping member and the outer circumferential surface of the image holding body, a portion of the toner that is about to fall from the distal end of the scraping member is dammed up to form a toner accumulation, and an external additive sticking to the toner is caused to be in contact with the image holding body at all times.

With such a configuration, however, the toner of the toner accumulation may aggregate. Such aggregation of the toner of the toner accumulation may hinder suppression of an increase in the frictional force that is generated between the scraping member and the outer circumferential surface of the image holding body.

Aspects of non-limiting embodiments of the present disclosure relate to a scraping member whose distal end is in contact with, in the outer circumferential surface of an image holding body, a region in which the image holding body moves upward from below, and relates to suppressing an increase in the frictional force that is generated between the scraping member and the outer circumferential surface of the image holding body, compared with when a portion of the toner that is about to fall from the distal end of the scraping member is dammed up to form a toner accumulation whose toner is likely to aggregate.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a cleaning device for cleaning an image holding body that rotates while holding a toner image on an outer circumferential surface of the image holding body, the cleaning device including: a scraping member that scrapes toner sticking to the outer circumferential surface of the image holding body in a rotating state by a distal end of the scraping member being in contact with, in the outer circumferential surface, a region in which the image holding body moves upward from below; a trapping member in which toner scraped from the outer circumferential surface to fall is trapped; and at least one raising member that raises up toner trapped in the trapping member, toward the distal end of the scraping member.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
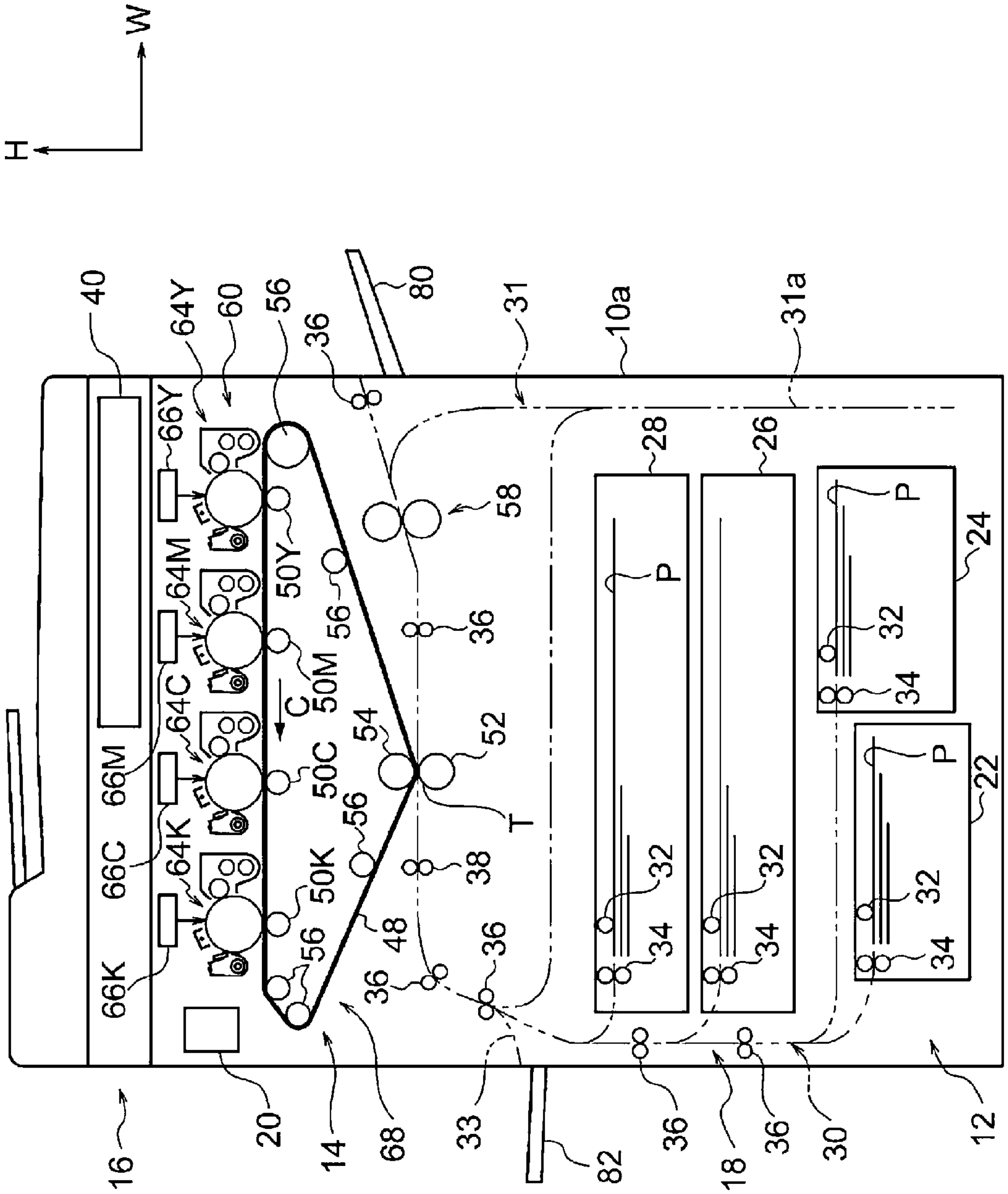
FIG. 1 illustrates schematically the configuration of an image forming apparatus according to a first exemplary embodiment of the present disclosure.

Examples of a cleaning device, an image holding body unit, and an image forming apparatus according to a first exemplary embodiment of the present disclosure will be described with reference to FIGS. 1 to 9. Note that, in the drawings, arrow H represents the vertical direction and an apparatus up-down direction, arrow W represents the horizontal direction and an apparatus width direction, and arrow D represents the horizontal direction and an apparatus depth direction.

Overall Configuration of Image Forming Apparatus 10

As FIG. 1 illustrates, an image forming apparatus 10 includes a paper sheet storage section 12, an image forming operation section 14, a document reading section 16, and a display section 40 that are arranged in this order from the lower side toward the upper side in the apparatus up-down direction. The image forming apparatus 10 further includes a transport section 18 that transports a sheet member P serving as a recording medium and includes a control section 20 that controls the operations of each of the sections.

The paper sheet storage section 12 stores sheet members P, the image forming operation section 14 forms an image on a sheet member P transported from the paper sheet storage section 12, the document reading section 16 reads an image of a document, and the display section 40 displays a screen with which the information passing is performed between a user and the image forming apparatus 10 and displays the information related to image formation.

Paper Sheet Storage Section 12

As FIG. 1 illustrates, the paper sheet storage section 12 includes a first storage 22, a second storage 24, a third storage 26, and a fourth storage 28 that are capable of storing sheet members P in different sizes.

In addition, each of the first storage 22, the second storage 24, the third storage 26, and the fourth storage 28 includes a feed roller 32 that feeds the stored sheet members P one by one and a multi-feed prevention roller 34 that transports the fed sheet members P one by one to a transport path 30 inside the image forming apparatus 10.

Transport Section 18

As FIG. 1 illustrates, the transport section 18 includes plural transport rollers 36 that receive the sheet members P from the multi-feed prevention roller 34 and transport the sheet members P one by one along the transport path 30. The transport section 18 further includes a registration roller 38 disposed upstream of a transfer position T, which will be described later, in a transport direction of a sheet member P (hereinafter, referred to simply as a "sheet transport direction"). The registration roller 38 temporarily stops a sheet member P and feeds the sheet member P to a second-transfer position at a predetermined timing.

A portion of the transport path 30 upstream in the sheet transport direction extends upward from below on one side in the apparatus width direction. On the other hand, a portion of the transport path 30 downstream in the sheet transport direction extends, from the one side toward the other side in the apparatus width direction, to a discharge part 80 through which a sheet member P is discharged outside an apparatus body 10*a*.

A duplex transport path 31 on which a sheet member P is transported and flipped vertically for forming an image on the back of the sheet member P is further connected to an end portion of the transport path 30 downstream in the sheet transport direction.

The duplex transport path 31 includes a switchback path 31*a*, and the sheet member P that has been fed through the switchback path 31*a* is flipped vertically and is then fed to an upper end portion of a portion of the transport path 30 upstream in the sheet transport direction.

A manual feed path 33 through which a sheet member P fed from a manual feed part 82 positioned outside the apparatus body 10*a* is transported is further connected to an upper end portion of the portion of the transport path 30 upstream in the sheet transport direction.

Image Forming Operation Section 14

As FIG. 1 illustrates, the image forming operation section 14 includes an image forming part 60 that forms a toner image, a transfer unit 68 that transfers the toner image onto a sheet member P, and a fixing device 58 that fixes the toner image formed on the sheet member P to the sheet member P.

Image Forming Part 60

The image forming part 60 includes image forming units 64Y, 64M, 64C, and 64K that form toner images of respective colors: yellow (Y), magenta (M), cyan (C), and black (K). Note that the letters Y, M, C, and K added to the last digits of the numeral signs are sometimes omitted when a distinction therebetween is not specifically made in the following description.

Figure 2:
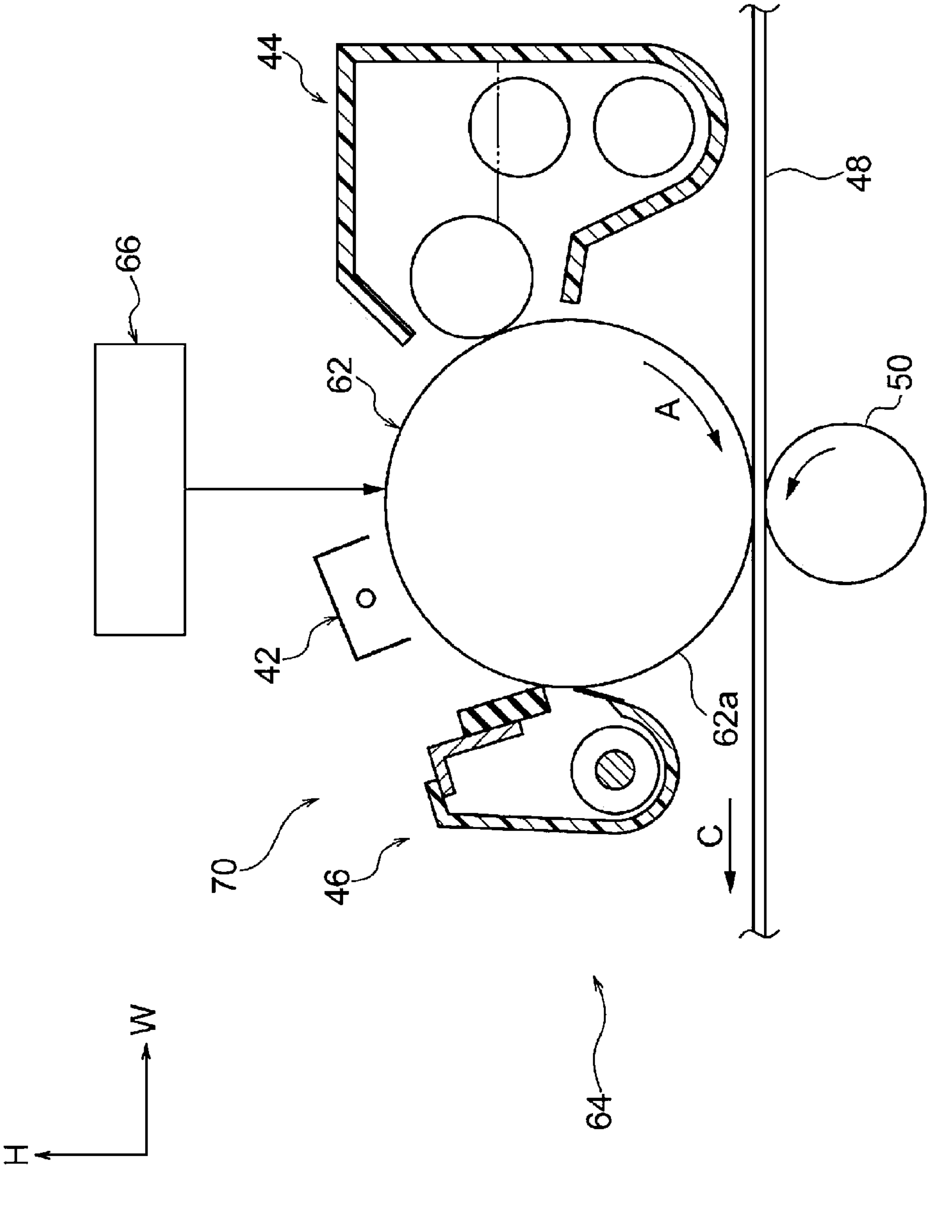
FIG. 2 illustrates the configuration of an image forming unit including an image holding body unit according to the first exemplary embodiment of the present disclosure.

As FIG. 2 illustrates, each of the image forming units 64 includes an image holding body 62 that has a columnar shape and rotates in a direction of arrow A in FIG. 2, a charger 42 that charges the image holding body 62, a developing device 44 that develops an electrostatic latent image, which will be described later, into a toner image for visualization, and a cleaning device 46 that cleans an outer circumferential surface 62*a* of the image holding body 62. The image holding body 62 and the cleaning device 46 are included in an image holding body unit 70. Note that the cleaning device 46 will be described in detail later.

The image forming part 60 further includes exposure devices 66Y, 66M, 66C, and 66K (refer to FIG. 1) that form electrostatic latent images by radiating exposure light to the respective image holding bodies 62 that have been charged by the respective chargers 42.

In this configuration, in each of the image forming units 64, the charger 42 charges the rotating image holding body 62, and the exposure device 66 forms an electrostatic latent image by radiating the exposure light to the charged image holding body 62. The developing device 44 then develops the electrostatic latent image into a toner image for visualization.

Transfer Unit 68

As FIG. 1 illustrates, the transfer unit 68 includes a transfer belt 48 being endless, first-transfer rollers 50 that transfer toner images from the respective image holding bodies 62 (refer to FIG. 2) onto the transfer belt 48, and a second-transfer roller 52 that transfers the toner images on the transfer belt 48 onto a sheet member P. The transfer unit 68 further includes an auxiliary roller 54 positioned on the opposite side from the second-transfer roller 52 with the transfer belt 48 interposed therebetween and plural rollers 56 around which the transfer belt 48 is wound. The transfer unit 68 is an example of a transfer member.

The transfer belt 48 is shaped into a triangle whose vertex is directed downward when viewed in the apparatus depth direction, and a base portion of the triangular shape of the transfer belt 48 is held between the image holding bodies 62 and the first-transfer rollers 50. In addition, a vertex portion of the triangular shape of the transfer belt 48 is held between the second-transfer roller 52 and the auxiliary roller 54.

One roller 56 of the plural rollers 56 functions as a driving roller that circularly moves the transfer belt 48 in a direction of arrow C in FIG. 1.

Operation of Image Forming Apparatus

The image forming apparatus 10 forms an image in a following way.

First, the chargers 42 of the respective colors illustrated in FIG. 2 uniformly negatively charge, at a predetermined potential, the outer circumferential surfaces 62*a* of the rotating image holding bodies 62 of the respective colors. Subsequently, the exposure devices 66 of the respective colors (refer to FIG. 1) form electrostatic latent images by radiating the exposure light to the outer circumferential surfaces 62*a* of the image holding bodies 62 of the respective colors based on the image data that have been read by the document reading section 16 (refer to FIG. 1).

Accordingly, the electrostatic latent images corresponding to the image data are formed on the outer circumferential surfaces 62*a* of the image holding bodies 62 of the respective colors. The developing devices 44 of the respective colors then develop the electrostatic latent images into toner images for visualization. The toner images formed on and held on the outer circumferential surfaces 62*a* of the image holding bodies 62 of the respective colors are transferred in order onto the transfer belt 48 by the first-transfer rollers 50.

At this point, a sheet member P that has been fed from any one of the first storage 22, the second storage 24, the third storage 26, and the fourth storage 28, which are illustrated in FIG. 1, to the transport path 30 by the feed roller 32 is fed to the transfer position T at which the transfer belt 48 and the second-transfer roller 52 are in contact with one another. At the transfer position T, the sheet member P is transported between the transfer belt 48 and the second-transfer roller 52, and the toner images on the transfer belt 48 are thereby transferred onto the sheet member P. Specifically, due to a potential difference arising between the auxiliary roller 54 and the second-transfer roller 52, the toner images on the transfer belt 48 are transferred onto the sheet member P.

The fixing device 58 fixes the toner images that have been transferred onto the sheet member P to the sheet member P. The sheet member P to which the toner images have been fixed is discharged to the discharge part 80 positioned outside the apparatus body 10*a*. Configuration of Relevant Part Next, the cleaning device 46 will be described.

Figure 3:
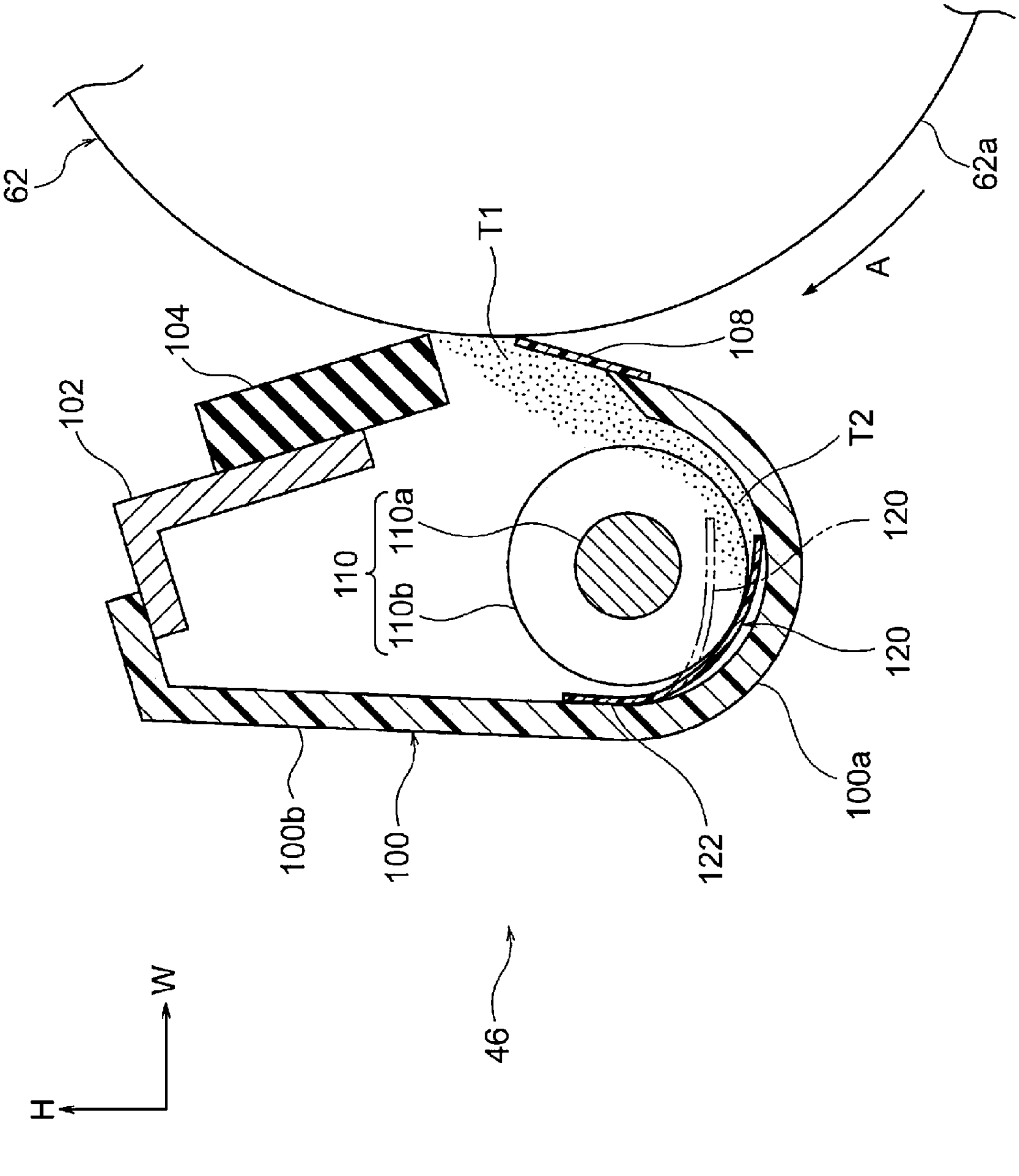
FIG. 3 is a sectional view of a cleaning device according to the first exemplary embodiment of the present disclosure.

As FIG. 3 illustrates, each of the cleaning devices 46 is disposed so as to face the outer circumferential surface 62*a* of the corresponding image holding body 62 in the apparatus width direction. The cleaning device 46 has a housing 100, a bracket 102, a scraping member 104, an extension member 108, a transport auger 110, and raising members 120.

Housing 100, Bracket 102, and Scraping Member 104

The housing 100 extends in the apparatus depth direction, and a portion thereof on the image holding body 62 side is open as FIG. 3 illustrates. The housing 100 incudes: a U-shaped portion 100*a* whose section has a U shape; and a side wall portion 100*b* extending upward from a portion, of the U-shaped portion 100*a*, positioned away from the image holding body 62, the side wall portion 100*b* having an upper end portion being bent. The housing 100 is an example of a trapping member.

An end portion of the bracket 102 that extends in the apparatus depth direction and whose section has an L shape is attached to the bent upper end portion of the side wall portion 100*b*. The bracket 102 extends downward from a portion thereof attached to the side wall portion 100*b*, and, to a lower end portion of the extending bracket 102, a proximal end of the scraping member 104 that extends in the apparatus depth direction and whose section has a rectangular shape is attached. The scraping member 104 is made of an elastic material, and a distal edge portion of the scraping member 104 is in contact with the outer circumferential surface 62*a* of a portion, of the image holding body 62, that moves upward from the lower side.

On the other hand, a proximal end of the extension member 108 extending in the apparatus depth direction and extending upward when viewed in the apparatus depth direction is attached to a portion, of the U-shaped portion 100*a* of the housing 100, positioned beside the image holding body 62. The extension member 108 is made of resin film, and a distal end of the extension member 108 is disposed below the distal end (lower end) of the scraping member 104 and is in contact with the outer circumferential surface 62*a* of the image holding body 62.

In this configuration, residual toner T1 sticking to the outer circumferential surface 62*a* of the image holding body 62 is scraped from the outer circumferential surface 62*a* by the scraping member 104 and falls downward from the distal end of the scraping member 104. The residual toner T1 that has fallen downward is trapped in the U-shaped portion 100*a* of the housing 100 and is then treated as waste toner T2. Note that, although the scraping member 104 scrapes the residual toner T1 sticking to the outer circumferential surface 62*a* of the image holding body 62, what the scraping member 104 scrapes is not limited to the residual toner T1 and may be any substance sticking to the outer circumferential surface 62*a* of the image holding body 62.

Transport Auger 110

Figure 4:
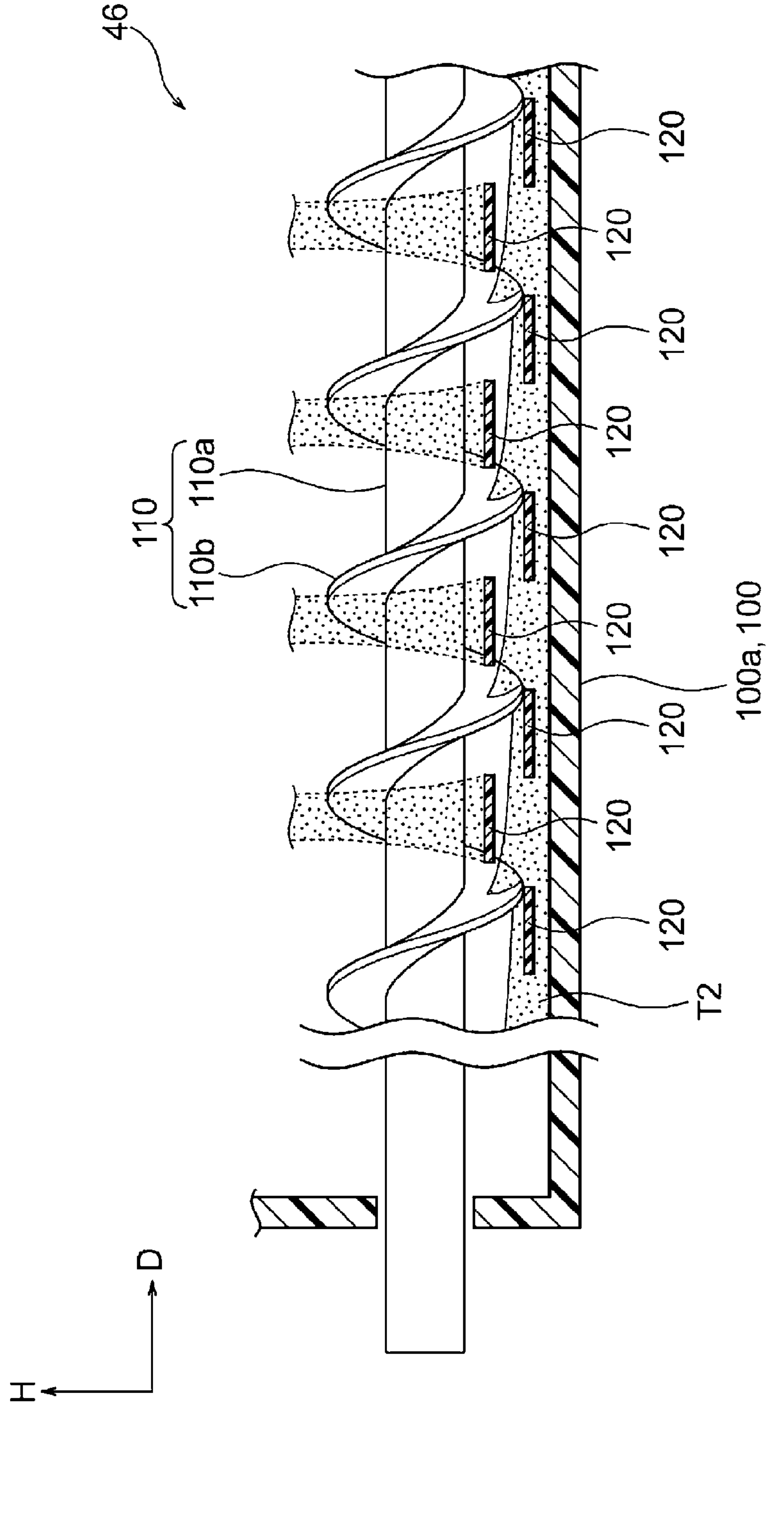
FIG. 4 is a front view of a transport auger and other elements included in the cleaning device according to the first exemplary embodiment of the present disclosure.
Figure 5:
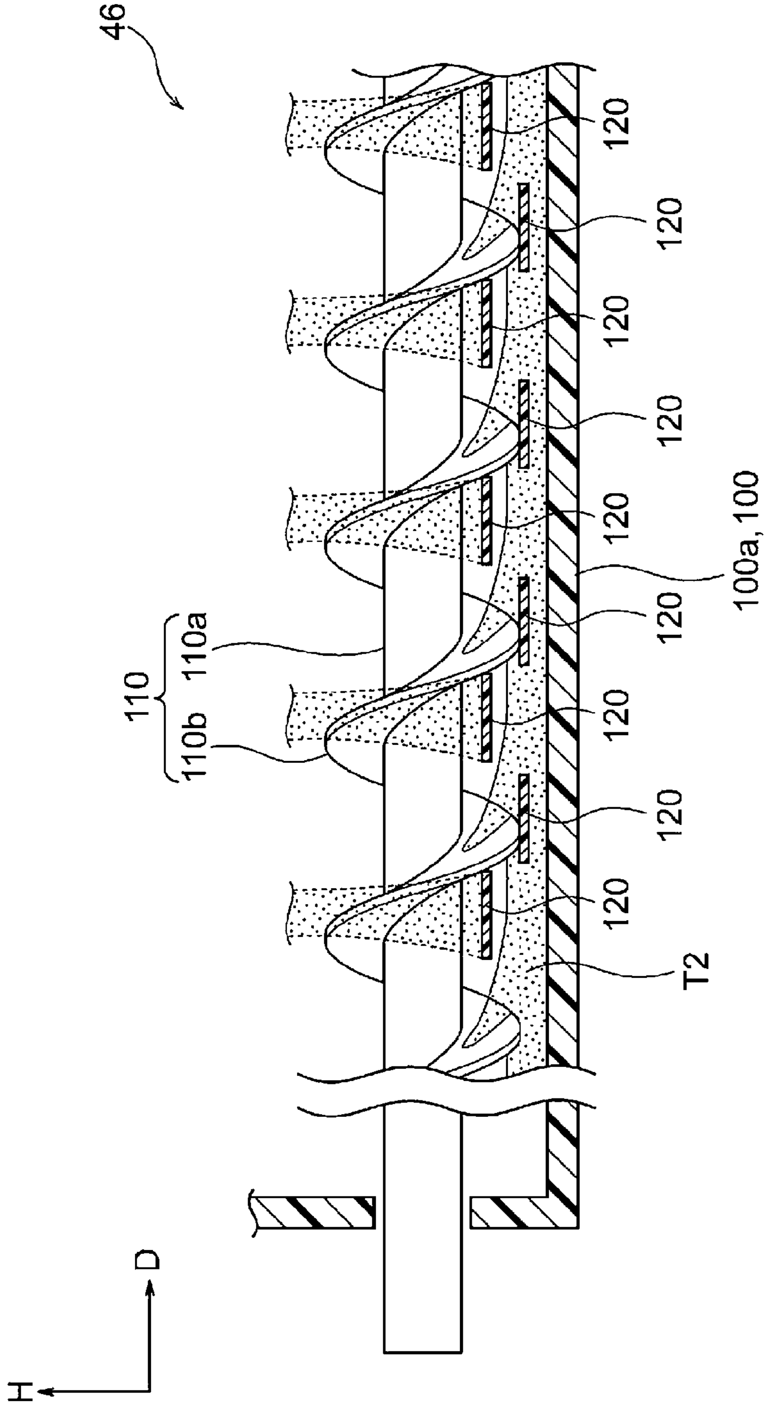
FIG. 5 is a front view of the transport auger and other elements included in the cleaning device according to the first exemplary embodiment of the present disclosure.

As FIG. 3 illustrates, the transport auger 110 is disposed inside the U-shaped portion 100*a* of the housing 100, and the axial direction thereof is parallel to the apparatus depth direction. As FIG. 4 and FIG. 5 illustrate, the transport auger 110 includes a shaft portion 110*a* and a blade portion 110*b* helically formed around the shaft portion 110*a*. The transport auger 110 is an example of a transport member.

In this configuration, the transport auger 110 is rotated in the circumferential direction of the shaft portion 110*a* in response to a driving force transmitted from a driving member, which is not illustrated. The rotating blade portion 110*b* moves, while pushing, the waste toner T2, which is the residual toner T1 that has fallen from the distal end of the scraping member 104 and has trapped in the U-shaped portion 100*a*, toward the back in the apparatus depth direction. Thus, the waste toner T2 is discharged through an outlet, which is not illustrated, formed at the back, in the apparatus depth direction, of the housing 100.

Raising Member 120

Figure 6:
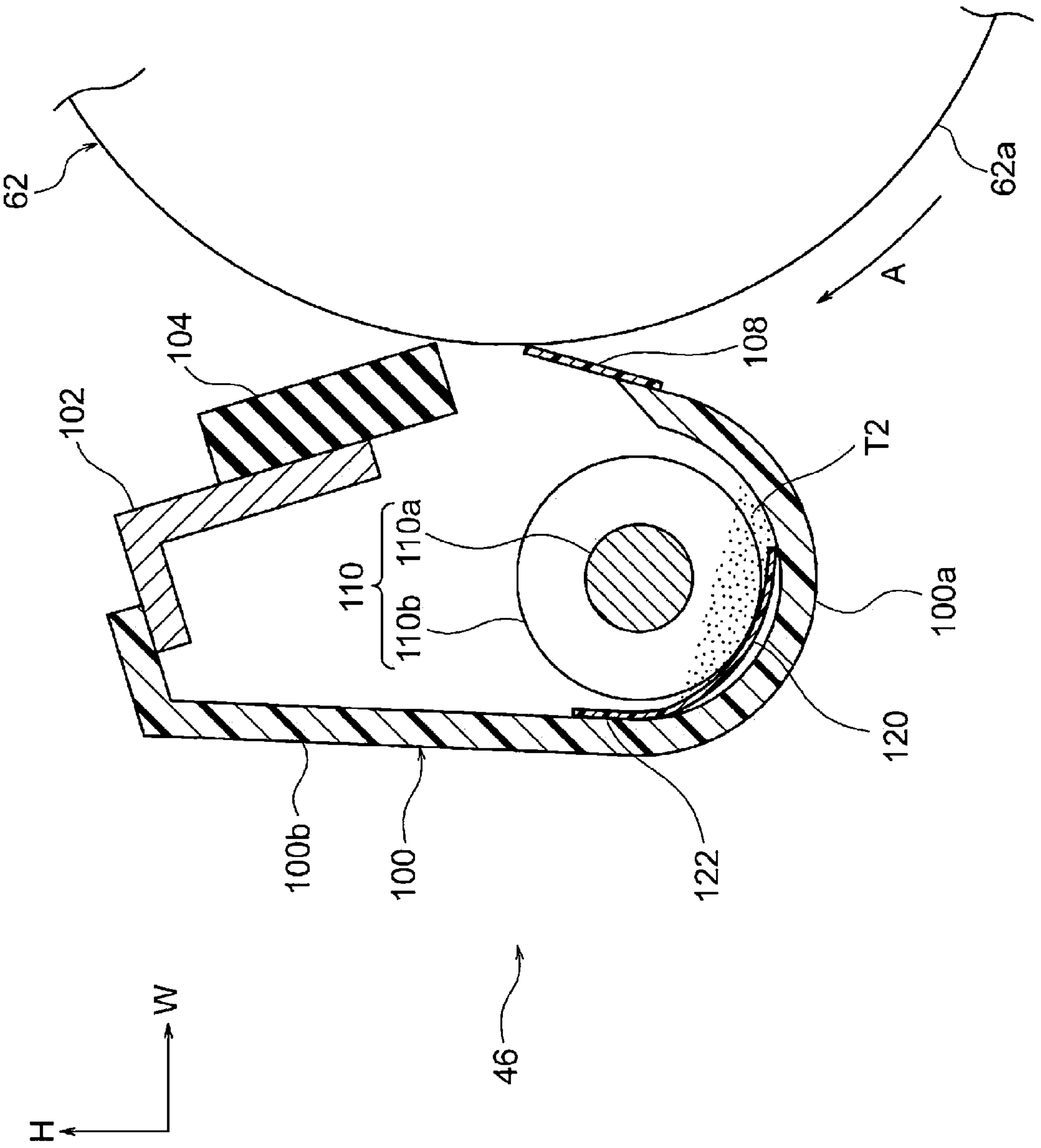
FIG. 6 is a sectional view of raising members and other elements included in the cleaning device according to the first exemplary embodiment of the present disclosure.
Figure 7:
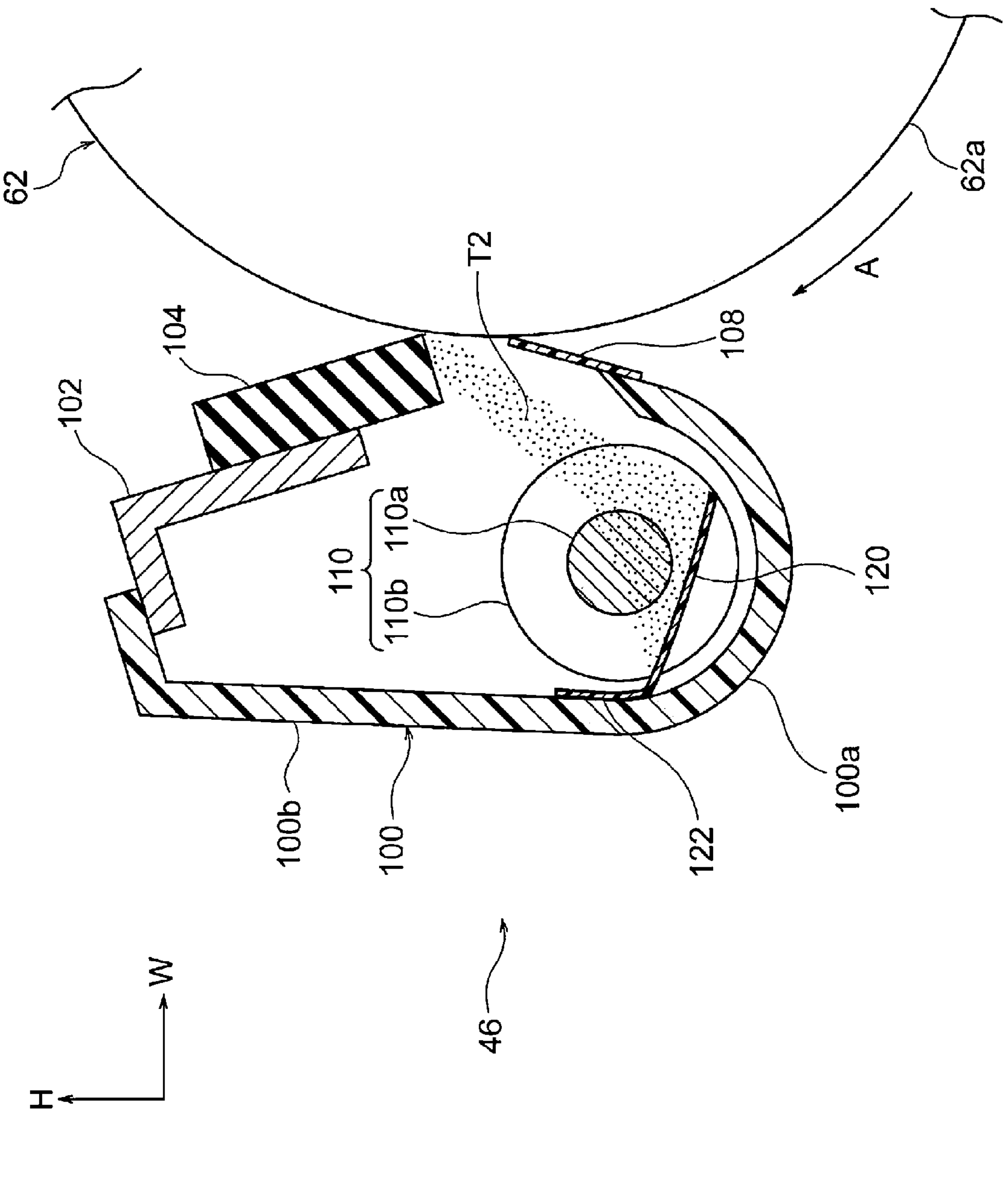
FIG. 7 is a sectional view of the raising member and other elements included in the cleaning device according to the first exemplary embodiment of the present disclosure.
Figure 8:
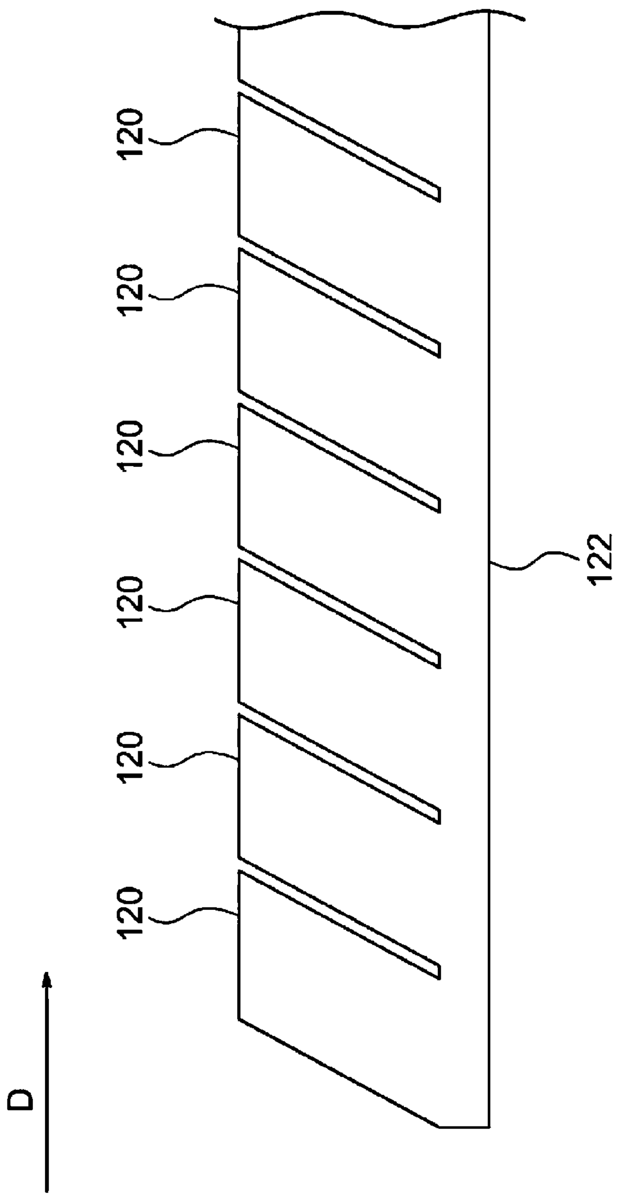
FIG. 8 is a developed view of the raising members included in the cleaning device according to the first exemplary embodiment of the present disclosure.

Each of the raising members 120 is resin film serving as a sheet member being elastically deformable and is disposed, inside the U-shaped portion 100*a* of the housing 100, in a region in which the waste toner T2 is trapped as FIG. 6 and FIG. 7 illustrate. FIG. 8 is a developed view of the raising members 120. As FIG. 8 illustrates, the raising members 120 are plural portions separated from one another in the apparatus depth direction and arranged in the axial direction of the transport auger 110. In the present exemplary embodiment, the raising members 120 are separated from one another in the axial direction with a pitch smaller than or equal to the pitch of the helix of the blade portion 110*b* of the transport auger 110. In other words, the pitch of the raising members 120 axially arranged is set smaller than or equal to the pitch of the helix of the blade portion 110*b* of the transport auger 110.

A connection portion 122 extending in the axial direction is connected to (continuous from) proximal ends of the plural raising members 120. Thus, the plural raising members 120 coupled to one another with the connection portion 122 are formed by a sheet of resin film being punched.

The raising members 120 are inclined relative to an orthogonal direction orthogonal to the apparatus depth direction. Although the details will be described later, the inclination relative to the orthogonal direction as described above enable the raising members 120 to easily move through the spaces between the axially adjacent turns of the blade portion 110*b*.

As FIG. 7 illustrates, the boundary between: the raising members 120; and the connection portion 122 is bent in a no-load state, and the connection portion 122 is attached to the inner circumferential surface of the U-shaped portion 100*a* with a material such as double-sided tape.

In this configuration, as FIG. 6 illustrates, the raising members 120 come into contact with and are pushed by the blade portion 110*b* of the rotating transport auger 110, thereby being elastically deformed. As FIG. 7 illustrates, the raising members 120 become separated from the blade portion 110*b* of the rotating transport auger 110 to move in the thickness direction of the raising members 120, thereby being elastically returned to the original state. As described above, because being inclined relative to the orthogonal direction orthogonal to the apparatus depth direction, the raising members 120 move through the spaces between the axially adjacent turns of the blade portion 110*b* and are elastically returned.

Specifically, as FIG. 4 illustrates, the odd-numbered raising members 120 from the near side to the far side in the apparatus depth direction come into contact with and are pushed by the blade portion 110*b* of the rotating transport auger 110, thereby being elastically deformed. On the other hand, the even-numbered raising members 120 from the near side to the far side in the apparatus depth direction become separated from the blade portion 110*b* of the rotating transport auger 110, thereby being elastically returned (refer to FIG. 7).

When the transport auger further rotates, as FIG. 5 illustrates, the odd-numbered raising members 120 from the near side to the far side in the apparatus depth direction become separated from the blade portion 110*b* of the rotating transport auger 110, thereby being elastically returned. On the other hand, the even-numbered raising members 120 from the near side to the far side in the apparatus depth direction come into contact with and are pushed by the blade portion 110*b* of the rotating transport auger 110, thereby being elastically deformed.

As described above, through the repetition of the elastic deformation and return, the raising members 120, in conjunction with the rotation of the transport auger 110, raise up the waste toner T2 that is being transported by the blade portion 110*b*, toward the distal end of the scraping member 104.

Operation

Next, the operation of the cleaning device 46 according to the present exemplary embodiment will be described alongside the operation of a cleaning device 746 according to a comparative form. First, the configuration of the cleaning device 746 according to the comparative form will be described.

Cleaning Device 746

Figure 9:
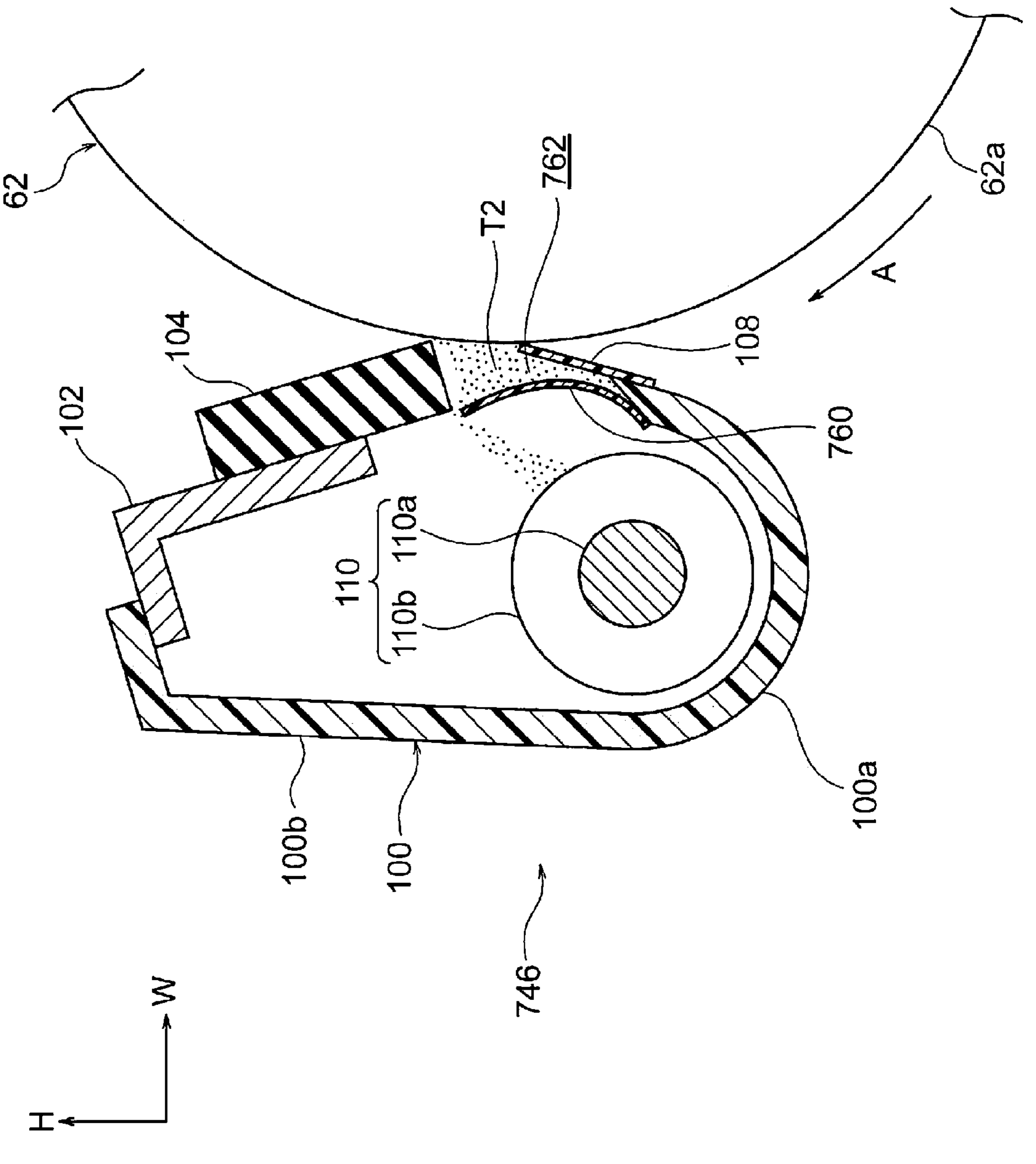
FIG. 9 is a sectional view of a cleaning device according to a comparative form relative to the first exemplary embodiment of the present disclosure.

As FIG. 9 illustrates, the cleaning device 746 includes an accumulation member 760 positioned below the scraping member 104. Note that the cleaning device 746 includes no raising members.

The accumulation member 760 is made of resin film, and a lower end portion of the accumulation member 760 is attached to a portion, of the U-shaped portion 100*a* of the housing 100, beside the image holding body 62. The accumulation member 760 is curved when viewed in the apparatus depth direction, and a gap 762 is formed between the accumulation member 760 and the image holding body 62. An upper end of the accumulation member 760 is separated from the scraping member 104 and is disposed below the scraping member 104.

Scraping Motion of Cleaning Device 746

In the cleaning device 746 according to the comparative form illustrated in FIG. 9, the residual toner T1 sticking to the outer circumferential surface 62*a* of the image holding body 62 is scraped from the outer circumferential surface 62*a* by the scraping member 104 and falls downward from the distal end of the scraping member 104. The residual toner T1 that has fallen downward is trapped in the gap 762 and is then treated as the waste toner T2, and a toner accumulation is thus formed.

The external additive sticking to the waste toner T2 trapped in the gap 762 builds up on the distal end of the scraping member 104 and may thereby suppress an increase in the frictional force that is generated between the scraping member 104 and the outer circumferential surface 62*a* of the image holding body 62. An excess portion of the waste toner T2 trapped in the gap 762 falls downward through a space between the accumulation member 760 and the scraping member 104 and are trapped in the U-shaped portion 100*a* of the housing 100. The excess portion of the waste toner T2 is transported by the transport auger 110 to be discharged outside the cleaning device 746.

In the cleaning device 746, however, the toner of the toner accumulation, which is constituted by the waste toner T2 trapped in the gap 762, may aggregate. Such aggregation of the toner of the toner accumulation hinders suppression of an increase in the frictional force that is generated between the scraping member 104 and the outer circumferential surface 62*a* of the image holding body 62.

Scraping Motion of Cleaning Device 46

In contrast, in the cleaning device 46 according to the present exemplary embodiment illustrated in FIG. 3, the residual toner T1 sticking to the outer circumferential surface 62*a* of the image holding body 62 is scraped from the outer circumferential surface 62*a* by the scraping member 104 and falls downward from the distal end of the scraping member 104. The residual toner T1 that has fallen downward is trapped in the U-shaped portion 100*a* of the housing 100 and is then treated as the waste toner T2, and the waste toner T2 is transported by the transport auger 110 to be discharged outside the cleaning device 46.

Here, as FIG. 4 and FIG. 5 illustrate, the raising members 120 come into contact with and are pushed by the blade portion 110*b* of the rotating transport auger 110, thereby being elastically deformed. In addition, the raising members 120 become separated from the blade portion 110*b* of the rotating transport auger 110 in the thickness direction of the raising members 120, thereby being elastically returned. As described above, through the repetition of the elastic deformation and return, the raising members 120 reciprocate in the thickness direction of the raising members 120. The raising members 120 that are reciprocating in the thickness direction raise up the waste toner T2 that is being transported by the blade portion 110*b*, toward the distal end of the scraping member 104. In other words, the raising members 120 raise up the waste toner T2 in conjunction with the rotation of the transport auger 110.

The external additive sticking to the waste toner T2 that has been raised up builds up on the distal end of the scraping member 104 and may thereby suppress an increase in the frictional force that is generated between the scraping member 104 and the outer circumferential surface 62*a* of the image holding body 62.

A portion of the waste toner T2 that has not been raised up by the raising members 120 is transported by the transport auger 110 to be discharged outside the cleaning device 46.

Conclusion

As described above, in the cleaning device 46, the raising members 120 raise up the waste toner T2 trapped in the U-shaped portion 100*a* of the housing 100, toward the distal end of the scraping member 104, and the external additive sticking to the raised waste toner T2 builds up on the distal end of the scraping member 104. Thus, with the cleaning device 46, the frictional force that is generated between the outer circumferential surface 62*a* of the image holding body 62 and the scraping member 104 may be suppressed from increasing, compared with the cleaning device 746 according to the comparative form.

In the cleaning device 46, the raising members 120 raise up the waste toner T2 in conjunction with the rotation of the transport auger 110. Thus, the waste toner T2 may be raised up regularly at predetermined intervals.

In the cleaning device 46, the raising members 120 reciprocate in the thickness direction of the raising members 120 in conjunction with the rotation of the transport auger 110. The raising members 120 that are reciprocating in the thickness direction raise up the waste toner T2 that is being transported by the blade portion 110*b*, toward the distal end of the scraping member 104. Thus, a configuration that raises up the waste toner T2 may be simplified, compared with when the waste toner T2 is raised up by using air pressure.

In the cleaning device 46, the raising members 120 raise up the waste toner T2 by being pushed by the rotating blade portion 110*b* to be elastically deformed and by moving away from the rotating blade portion 110*b* to be elastically returned. Thus, the configuration may be simplified compared with when a driving member specifically for moving the raising members 120 is provided.

In the cleaning device 46, the raising members 120 are separated from one another in the axial direction of the transport auger 110 with a pitch smaller than or equal to the pitch of the helix of the blade portion 110*b*. Thus, the raising members 120 are capable of moving through the spaces between the axially adjacent turns of the blade portion 110*b*, and the moving distances of the distal ends of the raising members 120 may thereby be large, compared with when the pitch of the raising members 120 is larger than the pitch of the helix of the blade portion.

In addition, the image holding body unit 70 includes the cleaning device 46. Thus, curling up of the scraping member 104 due to an increase in the frictional force that is generated between the outer circumferential surface 62*a* of the image holding body 62 and the scraping member 104 may be suppressed from being caused, and the residual toner T1 may thereby be efficiently scraped from the outer circumferential surface 62*a* of the image holding body 62, compared with when the cleaning device 746 is provided.

In addition, the image forming apparatus 10 includes the image holding body unit 70. Thus, the residual toner T1 may be efficiently scraped from the outer circumferential surface 62*a* of the image holding body 62, and the quality of an output image may thereby be suppressed from being reduced, compared with when an image holding body unit including the cleaning device 746 is provided.

The image forming apparatus 10 includes the cleaning device 46. Thus, the residual toner T1 may be efficiently scraped from the outer circumferential surface 62*a* of the image holding body 62, and the quality of an output image may thereby be suppressed from being reduced, compared with when the cleaning device 746 is provided.

Second Exemplary Embodiment

Examples of a cleaning device, an image holding body unit, and an image forming apparatus according to a second exemplary embodiment of the present disclosure will be described with reference to FIG. 10. Note that differences between the second exemplary embodiment and the first exemplary embodiment will be described.

Figure 10:
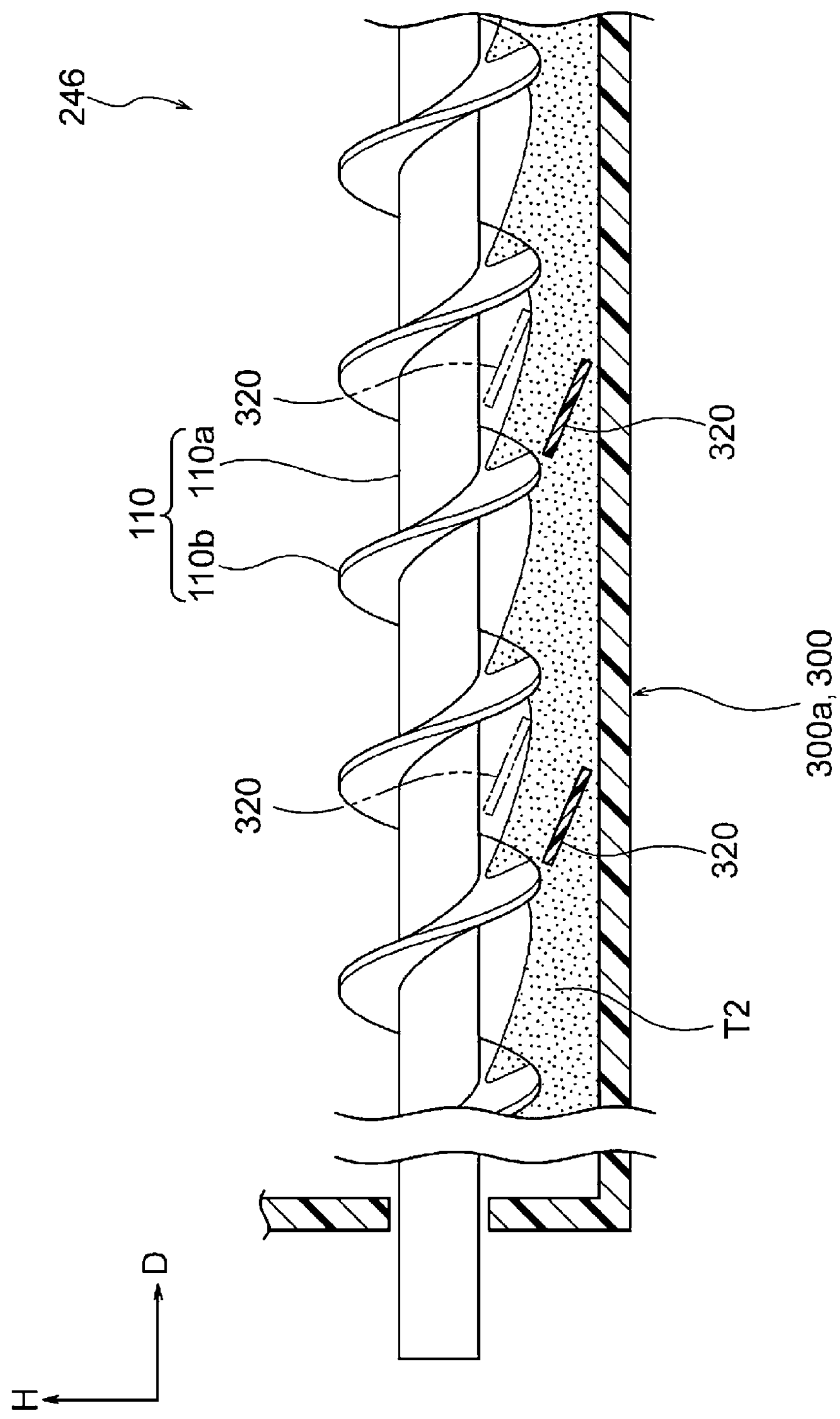
FIG. 10 is a front view of a transport auger and other elements included in a cleaning device according to a second exemplary embodiment of the present disclosure.

As FIG. 10 illustrates, an inner circumferential bottom of a U-shaped portion 300*a* of a housing 300 of a cleaning device 246 according to the second exemplary embodiment is apart from the blade portion 110*b* of the transport auger 110 in the up-down direction, compared with the instance of the cleaning device 46 of the first exemplary embodiment. Thus, the depth (thickness) of the accumulation of the waste toner T2 inside the housing 300 is great. The housing 300 is an example of the trapping member.

Raising members 320 are inclined relative to the apparatus depth direction when viewed in the apparatus width direction. Specifically, the raising members 320 are inclined so that, when the distal ends of the raising members 320 are moved, the moving distances of the raising members 320 are increased.

In this configuration, the raising members 320 raise up the waste toner T2 that has accumulated thickly in the housing 300, and the amount of the waste toner T2 that is raised up by the raising members 320 is thereby increased.

Third Exemplary Embodiment

Examples of a cleaning device, an image holding body unit, and an image forming apparatus according to a third exemplary embodiment of the present disclosure will be described with reference to FIG. 11. Note that differences between the third exemplary embodiment and the second exemplary embodiment will be described.

Figure 11:
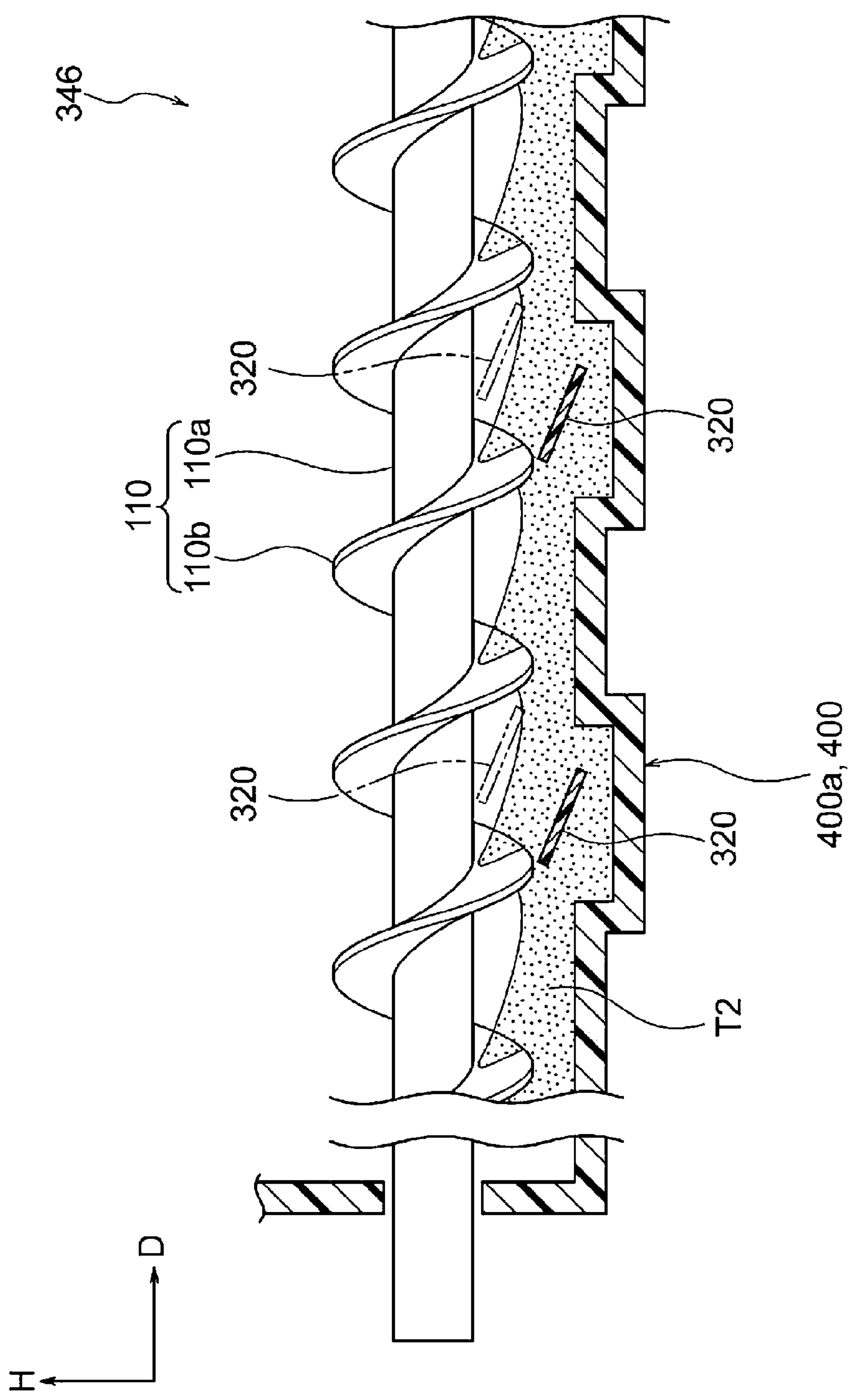
FIG. 11 is a front view of a transport auger and other elements included in a cleaning device according to a third exemplary embodiment of the present disclosure.

As FIG. 11 illustrates, a U-shaped portion 400*a* of a housing 400 of a cleaning device 346 according to the third exemplary embodiment has an uneven inner circumferential bottom. Specifically, in the inner circumferential bottom of the U-shaped portion 400*a*, portions by which the raising members 320 pass are recessed, and the other portions protrude. The housing 400 is an example of the trapping member.

Note that, although the present disclosure has so far been described in detail with the specific exemplary embodiments, the present disclosure is not limited to such exemplary embodiments, and it will be obvious to those skilled in the art that the present disclosure may also adopt various other exemplary embodiments within the scope of the present disclosure. For example, although the raising members 120 are used to raise up the waste toner T2 toward the distal end of the scraping member 104 in the above-described exemplary embodiments, air may be sent into the housing 100, and air pressure, for example, may be used to raise up the waste toner T2.

In addition, although the raising members 120 raise up the waste toner T2 in conjunction with the rotation of the transport auger 110 in the above-described exemplary embodiments, the raising members 120 are not necessarily operated in conjunction with the rotation of the transport auger 110. Such an instance, however, does not exhibit an effect produced by the operation of the raising members 120 in conjunction with the rotation of the transport auger 110.

Although the raising members 120 raise up the waste toner T2 by being pushed by the rotating blade portion 110*b* to be elastically deformed and by becoming separated from the rotating blade portion 110*b* to be elastically returned in the above-described exemplary embodiments, a driving member specifically for moving the raising members 120 may be provided. Such an instance does not exhibit an effect produced by the raising members 120 moving to be elastically deformed and returned due to the blade portion 110*b*.

Although the raising members 120 are separated from one another in the axial direction with a pitch smaller than or equal to the pitch of the helix of the blade portion 110*b* in the above-described exemplary embodiments, the raising members 120 may be separated from one another with a pitch larger than the pitch of the helix of the blade portion 110*b*. Such an instance does not exhibit an effect produced by the raising members 120 being separated from one another in the axial direction with a pitch smaller than or equal to the pitch of the helix of the blade portion 110*b*.

Although the image holding body 62 serving as the image holding body is described in the above-described exemplary embodiments, the image holding body may be any element whose outer circumferential surface is capable of holding a toner image, and the transfer belt 48 may serve as the image holding body.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A cleaning device for cleaning an image holding body that rotates while holding a toner image on an outer circumferential surface of the image holding body, the cleaning device comprising:

a scraping member that scrapes toner sticking to the outer circumferential surface of the image holding body in a rotating state by a distal end of the scraping member being in contact with, in the outer circumferential surface, a region in which the image holding body moves upward from below;

a trapping member in which toner scraped from the outer circumferential surface to fall is trapped; and at least one raising member that raises up toner trapped in the trapping member, toward the distal end of the scraping member.

(((2)))

The cleaning device according to (((1))), further comprising:

a transport member that, while rotating, transports toner trapped in the trapping member in an axial direction of the image holding body, wherein:

the at least one raising member raises up toner in conjunction with rotation of the transport member.

(((3)))

The cleaning device according to (((2))), wherein:

the at least one raising member is a sheet member being elastically deformable, the at least one raising member is disposed in a region in which toner is trapped in the trapping member, and the at least one raising member raises up toner while reciprocating in a thickness direction of the at least on raising member in conjunction with rotation of the transport member.

(((4)))

The cleaning device according to any one of (((1))) to (((3))), further comprising:

a transport member including a shaft portion extending in an axial direction of the image holding body and a blade portion helically formed around the shaft portion, the transport member, while rotating, transporting toner trapped in the trapping member in the axial direction of the image holding body, wherein:

the at least one raising member is made of a sheet member being elastically deformable and raises up toner by being pushed by the blade portion in a rotating state to be elastically deformed and by becoming separated from the blade portion in the rotating state to be elastically returned.

(((5)))

The cleaning device according to (((4))), wherein:

the at least one raising member comprises a plurality of raising members separated from one another in the axial direction with a pitch smaller than or equal to a pitch of a helix of the blade portion.

(((6)))

An image holding body unit comprising:

an image holding body that rotates while holding a toner image on an outer circumferential surface of the image holding body; and the cleaning device according to any one of (((1))) to (((5))).

(((7)))

An image forming apparatus comprising:

the image holding body unit according to (((6))); and a transfer member that transfers, onto a recording medium, a toner image held on the outer circumferential surface of the image holding body included in the image holding body unit.

(((8)))

An image forming apparatus comprising:

an image holding body that rotates while holding a toner image on an outer circumferential surface of the image holding body;

the cleaning device according to any one of (((1))) to (((5))); and a transfer member that transfers, onto a recording medium, a toner image held on the outer circumferential surface of the image holding body.

What is claimed is:

1. A cleaning device for cleaning an image holding body that rotates while holding a toner image on an outer circumferential surface of the image holding body, the cleaning device comprising:

a scraping member that scrapes toner sticking to the outer circumferential surface of the image holding body in a rotating state by a distal end of the scraping member being in contact with, in the outer circumferential surface, a region in which the image holding body moves upward from below;

a trapping member in which toner scraped from the outer circumferential surface to fall is trapped;

at least one raising member comprised of a sheet member being elastically deformable that raises up toner trapped in the trapping member, toward the distal end of the scraping member; and a transport member that, while rotating, transports toner trapped in the trapping member in an axial direction of the image holding body, wherein:

rotation of the transport member causes the at least one raising member to move from an original state to an elastically deformed state and further rotation of the transport member causes the raising member to elastically return to the original state thereby causing the raising up of the toner.

2. The cleaning device according to claim 1, wherein:

the at least one raising member is disposed in a region in which toner is trapped in the trapping member, and the at least one raising member raises up toner while reciprocating in a thickness direction of the at least on raising member in conjunction with rotation of the transport member.

3. The cleaning device according to claim 1, wherein the transport member comprises a shaft portion extending in an axial direction of the image holding body and a blade portion helically formed around the shaft portion, the transport member, while rotating, transporting toner trapped in the trapping member in the axial direction of the image holding body, wherein:

the at least one raising member raises up toner by being pushed by the blade portion in a rotating state to be elastically deformed and by becoming separated from the blade portion in the rotating state to be elastically returned.

4. The cleaning device according to claim 3, wherein:

the at least one raising member comprises a plurality of raising members separated from one another in the axial direction with a pitch smaller than or equal to a pitch of a helix of the blade portion.

5. An image holding body unit comprising:

an image holding body that rotates while holding a toner image on an outer circumferential surface of the image holding body; and the cleaning device according to claim 1.

6. An image holding body unit comprising:

an image holding body that rotates while holding a toner image on an outer circumferential surface of the image holding body; and the cleaning device according to claim 2.

7. An image holding body unit comprising:

an image holding body that rotates while holding a toner image on an outer circumferential surface of the image holding body; and the cleaning device according to claim 3.

8. An image holding body unit comprising:

an image holding body that rotates while holding a toner image on an outer circumferential surface of the image holding body; and the cleaning device according to claim 4.

9. An image forming apparatus comprising:

the image holding body unit according to claim 5; and a transfer member that transfers, onto a recording medium, a toner image held on the outer circumferential surface of the image holding body included in the image holding body unit.

10. An image forming apparatus comprising:

the image holding body unit according to claim 6; and a transfer member that transfers, onto a recording medium, a toner image held on the outer circumferential surface of the image holding body included in the image holding body unit.

11. An image forming apparatus comprising:

the image holding body unit according to claim 7; and a transfer member that transfers, onto a recording medium, a toner image held on the outer circumferential surface of the image holding body included in the image holding body unit.

12. An image forming apparatus comprising:

the image holding body unit according to claim 8; and a transfer member that transfers, onto a recording medium, a toner image held on the outer circumferential surface of the image holding body included in the image holding body unit.

* * * * *